(12) United States Patent
Lu et al.

(10) Patent No.: US 8,318,303 B2
(45) Date of Patent: Nov. 27, 2012

(54) MICROSPHERE PRESSURE SENSITIVE ADHESIVE COMPOSITION

(75) Inventors: Ying-Yuh Lu, Woodbury, MN (US); Kelly S. Anderson, Houlton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 837 days.

(21) Appl. No.: 12/337,293

(22) Filed: Dec. 17, 2008

(65) Prior Publication Data

US 2009/0156074 A1 Jun. 18, 2009

Related U.S. Application Data

(60) Provisional application No. 61/014,474, filed on Dec. 18, 2007.

(51) Int. Cl.
*B32B 7/12* (2006.01)
*B32B 27/04* (2006.01)
*C08F 8/30* (2006.01)

(52) U.S. Cl. ........ 428/343; 428/352; 442/151; 524/555; 524/556

(58) Field of Classification Search ............... 428/317.1, 428/317.3, 317.5, 317.7, 343, 352; 442/151
See application file for complete search history.

(56) References Cited

U.S. PATENT DOCUMENTS

| | | |
|---|---|---|
| 2,042,224 A | 5/1936 | Groll et al. |
| 3,691,140 A | 9/1972 | Silver |
| 4,092,354 A | 5/1978 | Shiraishi et al. |
| 4,729,978 A | 3/1988 | Sawicki |
| 4,786,756 A | 11/1988 | Paparizos et al. |
| 5,252,473 A | 10/1993 | Walkup et al. |
| 5,337,947 A | 8/1994 | Eskandry |
| 5,387,720 A | 2/1995 | Neher et al. |
| 5,464,760 A | 11/1995 | Tsai et al. |
| 5,571,617 A | 11/1996 | Cooprider et al. |
| 5,714,237 A | 2/1998 | Cooprider et al. |
| 5,824,748 A | 10/1998 | Kesti et al. |
| 6,203,720 B1 | 3/2001 | Thames et al. |
| 6,235,916 B1 | 5/2001 | Thames et al. |
| 6,838,150 B2 | 1/2005 | Mazurek et al. |
| 6,852,517 B1 | 2/2005 | Suthers et al. |
| 6,905,763 B2 | 6/2005 | Crandall et al. |
| 7,628,427 B2 | 12/2009 | Adler et al. |
| 2001/0046598 A1* | 11/2001 | Crandall et al. ........ 428/355 AC |
| 2003/0109630 A1 | 6/2003 | Smith et al. |
| 2005/0154162 A1 | 7/2005 | Guo et al. |
| 2005/0182182 A1 | 8/2005 | Morishita et al. |
| 2007/0281152 A1 | 12/2007 | Yamamoto |
| 2009/0156074 A1 | 6/2009 | Lu et al. |
| 2010/0167614 A1* | 7/2010 | Lu et al. ........................ 442/151 |
| 2010/0170843 A1 | 7/2010 | Yamato et al. |
| 2010/0261806 A1* | 10/2010 | Koch ............................. 522/170 |

FOREIGN PATENT DOCUMENTS

| | | |
|---|---|---|
| EP | 0 371 635 A2 | 6/1990 |
| JP | 2007-177045 | 7/2007 |
| WO | WO 96/01295 | 1/1996 |
| WO | WO 01/81491 A1 | 11/2001 |

OTHER PUBLICATIONS

ASTM D 6866-06a, *Standard Test Methods for Determining the Biobased Content of Natural Range Materials Using Radiocarbon and Isotope Ratio Mass Spectrometry Analysis*.
Kirk-Othmer Encyclopedia of Chemical Technology; Alcohols, Higher Aliphatic; Survey and Natural Alcohols Manufacture, (1991), pp. 865-893, vol. 1, $4^{th}$ Ed., John Wiley & Sons, Inc., New York.
Odian, "Principles of Polymerization", (1991) $3^{rd}$ Ed., John Wiley & Sons, Inc., New York.

* cited by examiner

*Primary Examiner* — Lynda Salvatore
(74) *Attorney, Agent, or Firm* — Robert H. Jordan

(57) ABSTRACT

The present invention provides an adhesive made from a reaction product of: (a) a polymerizable monomer derived at least in part from non-petroleum resources; (b) an initiator; (c) a polymeric stabilizer, wherein the reaction occurs in water to yield a microsphere adhesive. The microsphere adhesive can be formulated into a pressure sensitive adhesive composition that can be applied to various substrates such as paper and polymeric film to produce repositionable adhesive coated articles such as tapes, notes, flags, easels and the like.

24 Claims, No Drawings ature (e.g., 20° C.).

MICROSPHERE PRESSURE SENSITIVE ADHESIVE COMPOSITION

PRIORITY CLAIM

This application claims priority to U.S. Provisional Application No. 61/014,474, filed Dec. 18, 2007.

FIELD OF INVENTION

This invention relates to pressure-sensitive adhesive compositions, in particular, to pressure sensitive adhesive compositions comprising one or more polymerized monomer(s) derived at least in part from non-petroleum sources.

BACKGROUND

Certain compositions of pressure sensitive adhesives ("PSAs") are known to possess the following properties: (1) aggressive and permanent tack, (2) adherence with no more than finger pressure, (3) sufficient ability to hold onto a substrate, and (4) sufficient cohesive strength to be removed cleanly from the substrate. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.).

Microsphere adhesives have proven to be extremely useful for use in PSAs because they allow a PSA-bearing article to be repositionable, i.e., to be attached and re-attached to different surfaces multiple times. Thus, microsphere adhesives have been used in consumable products such as, but not limited to, repositionable notes, repositionable flags or index tabs, and repositionable easel pads. Important characteristics of microsphere PSAs include, e.g., cost, manufacturability, environmental impact, and, of course, the above-noted adhesive properties. Typically, such adhesives comprise a reaction product of (a) a polymerizable monomer derived from petroleum-based resources, e.g., $C_4$ to $C_{14}$ alkyl(meth)acrylate, optionally a comonomer; (b) an initiator; and (c) a stabilizer, wherein the reaction occurs in water to yield a microsphere adhesive. Illustrative examples of such adhesives are disclosed in U.S. Pat. No. 5,571,617 (Cooprider et al.) and U.S. Pat. No. 5,714,237 (Cooprider et al.). Typically such monomers have been derived from petroleum-based sources.

The need exists for new adhesive compositions, and other products, that are made from renewable raw materials.

SUMMARY

It has now been found that highly desirable microsphere PSAs can be made by using monomers derived from non-petroleum resources. While microspheres used in PSAs for decades have relied on petroleum derived monomers, it has been found that microspheres made from non-petroleum derived monomers result in excellent PSAs. In particular, the non-petroleum derived microspheres and PSAs made therefrom as described herein are cost effective, manufacturable, environmentally friendly (enabling reduction in use of petroleum-based feedstocks and reduction in omission of greenhouse gases), have lower adhesion build to paper over an extended period of time, and better vertical hang as compared to microspheres made from petroleum derived monomers. Thus, some of the advantages provided by the adhesive compositions of the invention include reduction in use of petroleum derived materials, reduction in emission of global warming gases, and superior or improved adhesive performance.

The present invention provides a solution for making microsphere adhesives made from a reaction product of, among other components, at least one polymerizable monomer, where at least a portion of the monomer is derived from a non-petroleum resource. Nonlimiting examples of non-petroleum resource for the polymerizable monomers include castor oil. The microsphere adhesives can be mixed with other constituents to form a microsphere PSA composition that can then be applied to various substrates or backing to yield articles such as tapes, labels, notes, flags, and the like. Advantageously, the article containing the microsphere PSA composition is repositionable.

As used herein, the term "non-petroleum" refers generally to a compound for which crude oil or its derivatives are not the ultimate raw material (i.e., starting material). An exemplary non-petroleum resource includes, but is not limited to, biobased resources, such as those derived from plants. As used herein, an article is "repositionable" if it can be attached to and removed from display surfaces multiple times without leaving adhesive residue upon the intended display surface and or damaging the surfaces. As used herein the term (meth) acrylate includes acrylate and methacrylate. For example 2-octyl(meth)acrylate includes 2-octylacrylate and 2-octylmethacrylate.

In one aspect, the present invention provides an adhesive made from a reaction product comprising, and in some embodiments consisting essentially of:

(a) one or more polymerizable monomer(s) derived at least in part from non-petroleum resources;

(b) one or more initiator(s); and (c) one or more stabilizer(s), wherein the reaction occurs in water and wherein the adhesive is a microsphere adhesive. The stabilizer may include one or more surfactant(s).

To determine if a polymerizable monomer contains biobased content so that it is considered non-petroleum, one can use ASTM D 6866-06a, *Standard Test Methods for Determining the Biobased Content of Natural Range Materials Using Radiocarbon and Isotope Ratio Mass Spectrometry Analysis*. As described herein, adhesive compositions of the present invention can be made which have biobased carbon content of at least about 30%, preferably at least about 40%, and most preferably at least about 50%, and in some embodiments, of at least about 65% as determined in accordance with this ASTM. The "biobased carbon content" refers to the proportion of total carbon in the composition that originates through use of biologically produced feedstocks, e.g., monomer materials derived from fermentation of plant matter or extracted from plans directly, as opposed to being derived from petroleum sourced materials such as the alkyl(meth)acrylates that are derived from petroleum sources.

In another aspect, the present invention pertains to an adhesive comprising, or in some embodiments consisting essentially of, a reaction product of:

(a) from about 92 to 99.9 wt % 2-octyl(meth)acrylate prepared by reacting (meth)acrylic acid with 2-octanol wherein the 2-octanol is derived from a non-petroleum resource;

(b) from about 0.01 to 4.0 wt % of polymeric stabilizer(s); and (c) from about 0.01 to 4.0 wt % of initiator(s), wherein the wt % of each component is based on the total of components (a) to (c) and wherein the reaction occurs in water to yield a microsphere adhesive.

In yet another aspect, the present invention pertains to an adhesive comprising, or in some embodiments consisting essentially of, a reaction product of:

(a) from about 87 to 99.9 wt % of 2-octyl(meth)acrylate prepared by reacting acrylic acid and 2-octanol wherein the 2-octanol is derived from a non-petroleum resource;

(b) from about 0.01 to 5 wt % of one or more surfactant(s);

(c) from about 0.01 to 4 wt % of one or more polymeric stabilizer(s);

(d) from about 0.01 to 4 wt % of one or more initiator(s); wherein the wt % of each component is based on the total of components (a) to (d);

(e) up to about 75 wt %, based on component (a), of one or more alkyl(meth)acrylate comonomer(s) having from about 1 to 14 carbon atoms;

(f) less than about 5 wt %, based on component (a), of one or more polar comonomer(s);

(g) up to about 10 wt %, based on component (a), of one or more amido comonomer(s);

(h) up to about 10 wt %, based on component (a), of one or more polyethylene oxide (meth)acrylate(s);

(i) up to about 30 wt %, based on component (a), of one or more solute polymer(s); and (j) up to about 0.2 wt %, based on component (a), of one or more chain transfer agent(s), (k) up to about 5 wt %, based on component (a), of one or more ionic monomer(s), (l) up to about 1 wt %, based on component (a), of one or more crosslinker(s), wherein the reaction occurs in water to yield a microsphere adhesive.

DETAILED DESCRIPTION OF ILLUSTRATIVE EMBODIMENTS

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5).

Polymerizable Monomer(s)

We have discovered that microsphere PSAs can be made using one or more polymerizable monomers derived from non-petroleum or biobased resources and that such adhesive compositions provide surprising results.

One exemplary polymerizable monomer is 2-octyl(meth) acrylate. This monomer can be prepared by stoichiometrically reacting (meth)acrylic acid with 2-octanol. The (meth) acrylic acid can be derived from a petroleum resource or, preferably, a non-petroleum resource. The 2-octanol is prepared from a non-petroleum resource such as by treating ricinoleic acid which has been derived from castor bean oil harvested and extracted from the beans of castor plants with sodium hydroxide, followed by distillation from the co-product of sebacic acid.

While 2-octyl(meth)acrylate derived at least in part, and preferably substantially totally, from a non-petroleum resource is one exemplary polymerizable monomer, other petroleum and or non-petroleum polymerizable comonomers can be used in the reaction product in addition to or in place of the 2-octyl(meth)acrylate. Suitable polymerizable comonomers are discussed in detail below.

Polymeric Stabilizer(s)

One or more polymeric stabilizers are used in the reaction mixture to prepare the microsphere adhesive. Advantageously, the presence of the stabilizer permits the use of relatively low amounts of surfactants while still obtaining microspheres.

Any polymeric stabilizer that effectively provides sufficient stabilization of the final polymerized droplets and prevents agglomeration within a suspension polymerization process is useful in this invention. When used, the polymeric stabilizer component(s) will typically be present in the reaction mixture in a total amount by weight of about 0.01 to about 4 parts by weight per 100 parts of polymerizable monomer(s), and in some embodiments will be present in an amount by weight of about 0.04 to about 1.5 parts by weight per 100 parts of polymerizable monomer(s).

Suitable polymeric stabilizers include, but are not limited to, salts of polyacrylic acids of greater than 5000 weight average molecular weight (e.g., ammonium, sodium, lithium and potassium salts of polyacrylic acids), carboxy modified polyacrylamides (e.g., CYANAMER® A-370 from American Cyanamid), copolymers of acrylic acid and dimethylaminoethylmethacrylate and the like, polymeric quaternary amines (e.g., General Alanine and Film's GAFQUAT® 755, a quaternized polyvinyl-pyrollidone copolymer, or Union Carbide's "JR-400", a quaternized amine substituted cellulosic), cellulosics, and carboxy-modified cellulosics (e.g., Hercules' NATROSOL® CMC Type 7L, sodium carboxy methylcellulose), and polyacrylamide (e.g., CYANAMER N300 from Cytek).

Initiator(s)

One or more initiators are used in the reaction mixture to prepare the microsphere adhesive. Initiators affecting polymerization are those that are normally suitable for free-radical polymerization of the polymerizable monomers. When 2-octyl(meth)acrylate or other (meth)acrylate monomers are used, in whole or in part, as the polymerizable monomers, suitable initiators include, but are not limited to, thermally-activated initiators such as azo compounds, hydroperoxides, peroxides and the like. Suitable photoinitiators include, but are not limited to, benzophenone, benzoin ethyl ether, and 2,2-dimethoxy-2-phenyl acetophenone. Other suitable initiators include lauroyl peroxide and bis(t-butyl cyclohexyl)peroxy dicarbonate.

The initiator(s) is present in a catalytically effective amount sufficient to bring about high monomer conversion in a predetermined time span and temperature range. Typically, the initiator component(s) is/are present in total amounts ranging from 0.01 to approximately 4 parts per weight per 100 parts by weight of the polymerizable monomer(s). Parameters that affect the concentration of initiator(s) used include the type of initiator(s) and particular monomer(s) involved. Depending upon the embodiment, catalytically effective total initiator concentrations will typically range from about 0.03 to about 2 parts by weight, and in some embodiments from about 0.05 to about 0.50 parts by weight, per 100 parts of the polymerizable monomer(s).

Surfactant(s)

One or more surfactant(s) may be used in the reaction mixture to prepare the microsphere adhesive, e.g., to facilitate achieving desired particle size. As will be understood by those skilled in the art, the surfactant(s) will typically be present in the reaction mixture in a total amount of up to about 5 parts by weight per 100 parts by weight of polymerizable monomer(s) content, sometimes up to about 3 parts by weight per 100 parts by weight of polymerizable monomer(s) content, and in some embodiments in the range of 0.2 to 2 parts by weight per 100 parts by weight of polymerizable monomer(s).

Useful surfactants include anionic, cationic, nonionic or amphoteric surfactants. Useful anionic surfactants include, but are not limited to, alkyl aryl sulfonates, e.g., sodium dodecylbenzene sulfonate and sodium decylbenzene sulfate, sodium and ammonium salts of alkyl sulfates, e.g., sodium lauryl sulfate, and ammonium lauryl sulfate. Useful nonionic surfactants include, but are not limited to, ethoxylated oleoyl alcohol and polyoxyethylene octylphenyl ether. Useful cationic surfactants include, but are not limited to, a mixture of alkyl dimethylbenzyl ammonium chlorides wherein the alkyl chain contains from 10 to 18 carbon atoms. Useful amphoteric surfactants include, but are not limited to, sulfobetaines, N-alkylaminopropionic acids, and N-alkybetaines.

Chain Transfer Agent(s)

Depending upon the desired application, one or more modifier(s) may be used to regulate the solvent soluble portion (percent extractable) of the microspheres and to control properties of the resultant adhesive composition. As will be understood by those skilled in the art, if used, such agents are often added to the reaction mixture in an amount sufficient to provide a solvent soluble portion that is in the range of 10 to 98%, preferably in the range of 20 to 80%. Various modifiers may be used. The amounts used are those that sufficiently provide the microspheres with a solvent soluble portion.

Particularly useful modifiers are chain transfer agents. To control the molecular weight of the polymer being formed in the microsphere it is desirable to use a chain transfer agent. Many halogen- and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. The amount of chain transfer agent suitable for these microsphere polymerizations is calculated on a weight basis to the entire polymerizable content. When used, chain transfer agents are typically added at amounts totaling up to about 0.2%, in some embodiments totaling up to about 0.12%, and in still other embodiments totaling up to about 0.08%, of the amount of polymerizable monomer. These levels are adequate to provide a soluble polymer content in the microsphere of up to about 98%.

Crosslinking Agent(s)

One or more crosslinking agent(s) may be used in the reaction mixture to modify the properties of the resultant adhesive if desired as will be understood by those skilled in the art. Nonlimiting examples of suitable crosslinking agents include multifunctional (meth)acrylate(s), e.g., butanediol diacrylate or hexanediol diacrylate, or other multifunctional crosslinkers such as divinylbenzene and mixtures thereof. When used, crosslinker(s) is/are added at a total level of up to about 1 equivalent weight percent, preferably up to about 0.5 equivalent weight percent, of the total reaction mixture with the proviso that the combination of crosslinking agent and modifier concentrations are chosen to obtain a microsphere with 10 to 98% solvent soluble portion.

Polymerizable Comonomer(s)

The reaction mixture can further include one or more polymerizable comonomers including the following: alkyl(meth) acrylates where the alkyl group contains 1 to 14 carbon atoms, vinyl ester monomers, ionic monomers, polar monomers, amino-functional monomers, amido-functional monomers, and monomers having a nucleus or portion of the nucleus. Each type of polymerizable comonomers, whether derived from a petroleum or non-petroleum resource, is further described in detail below.

Depending upon the desired results, up to 20 wt %, in some embodiments up to 50 wt %, and in still other embodiments up to 75 wt %, based on the 2-octyl(meth)acrylate content, of alkyl(meth)acrylate can be used. Suitable alkyl(meth)acrylates include, but are not limited to isooctyl acrylate, isononyl (meth)acrylate, isoamyl (meth)acrylate, isodecyl (meth)acrylate, 2-ethylhexyl acrylate, n-butyl (meth)acrylate, sec-butyl (meth)acrylate, propyl(meth)acrylate, ethyl (meth)acrylate, methyl (meth)acrylate, isobornyl (meth)acrylate, 4-methyl-2-pentyl (meth)acrylate, 2-methylbutyl (meth)acrylate, t-butyl (meth)acrylate, and mixtures thereof.

When used in the reaction mixture to produce the microsphere adhesive, depending upon the desired properties, up to 0.5 wt %, in some embodiments up to 2 wt %, and in some other embodiments up to 5 wt %, based on the 2-octyl(meth) acrylate content, of a polar comonomer can be used. The polar comonomer may or may not contain a dissociable hydrogen. Nonlimiting examples of polar comonomers include organic carboxylic acids having 3 to about 12 carbon atoms and having generally 1 to about 4 carboxylic acid moieties, and hydroxyl(alkyl) (meth)acrylates. Nonlimiting examples of such comonomers include itaconic acid, fumaric acid, crotonic acid, maleic acid, beta-carboxyethylacrylate, acrylamide, methacrylamide, 2-hydroxyethyl(meth)acrylate, 4-hydroxybutyl(meth)acrylate, and glyercol mono(meth)acrylate. While (meth)acrylic acid can be used a polar comonomer, typically less than 0.5% is used in the reaction product. When more than 0.5% of the (meth)acrylic acid is used in the reaction mixture coagulation problems may arise.

When used in the reaction mixture to produce the microsphere adhesive up to 20 wt %, based on the 2-octyl(meth) acrylate content, of a vinyl or vinyl ester comonomer can be used. Nonlimiting examples of vinyl ester comonomers include vinyl 2-ethylhexanoate, vinyl caprate, vinyl laurate, vinyl pelargonate, vinyl hexanoate, vinyl propionate, vinyl decanoate, vinyl actanoate, vinyl acetate and other monofunctional unsaturated vinyl esters of linear or branched carboxylic acids comprising 1 to 14 carbon atoms. Nonlimiting examples of vinyl comonomer include styrene and alpha-methylstyrene.

When used in the reaction mixture to produce the microsphere adhesive depending upon the desired properties, up to 1 wt %, in some embodiments up to 2 wt %, and in some other embodiments up to 5 wt %, based on the 2-octyl(meth)acrylate content, of an ionic comonomer can be used. Nonlimiting examples of ionic comonomers include sodium styrene sulfonate, sodium (meth)acrylate, ammonium (meth)acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxyethyl)ammonium propionate betaine, trimethylamine (meth)acrylimide, 1,1-dimethyl-1(2,3-dihydroxypropyl)amine (meth)acrylimide, any zwitterionic monomer, and the like.

When used in the reaction mixture to produce the microsphere adhesive up to 5 wt %, based on the 2-octyl(meth) acrylate content, of an amino functional comonomer can be used. The amino functional comonomer can have a nucleus or portion of the nucleus. Nonlimiting examples of amino functional comonomer include N,N-dimethyl-aminoethyl (meth) acrylate, N,N-dimethylaminopropyl (meth)acrylate, t-butylaminoethyl (meth)acrylate, and N,N-diethylamino (meth) acrylate.

When used in the reaction mixture to produce the microsphere adhesive depending upon the desired properties, up to 5 wt %, in some embodiments up to 8 wt %, and in some other embodiments up to 10 wt %, based on the 2-octyl(meth) acrylate content, of an amido functional comonomer can be used. The amido functional comonomer can have a nucleus or a portion of a nucleus. Nonlimiting examples of amido functional comonomer include N-vinyl pyrrolidone, N-vinyl caprolactom, acrylamide, N,N-dimethyl acrylamide, and combinations thereof.

When used in the reaction mixture to produce the microsphere adhesive depending upon the desired properties, up to 5 wt %, in some embodiments up to 8 wt %, and in some other embodiments up to 10 wt %, based on the 2-octyl(meth) acrylate content, of one of the following polymerizable comonomer can be used: 2-hydroxyethyl (meth)acrylate, glycerol mono(meth)acrylate, and 4-hydroxybutyl (meth) acrylate, (meth)acrylate terminated poly(ethylene oxide); methoxy poly(ethylene oxide) methacrylate; butoxy poly (ethylene oxide) methacrylate; (meth)acrylate terminated poly(ethylene glycol); methoxy poly(ethylene glycol) methacrylate; butoxy poly(ethylene glycol) methacrylate, and combinations thereof.

Typically, when the polymerizable comonomer is present in the reaction mixture, the relative amounts by weight of the 2-octyl(meth)acrylate monomer and the polymerizable comonomer is in the range of about 99.5/0.5 to 25/75, and preferably is in the range of 98/2 to 50/50.

Solute Polymer(s)

Another component that may be added to the reaction product to prepare the microsphere adhesive is one or more solute polymer(s) as described in detail in U.S. Pat. No. 5,824,748 (Kesti et al.).

A solute polymer which is essentially water insoluble may be comprised of any monomer or mixture of monomers that upon polymerization provides a polymer that can be dissolved into the 2-octyl(meth)acrylate monomer or a mixture of the 2-octyl(meth)acrylate monomer and the polymerizable comonomer(s) described above. Typically, solute polymers have a weight average molecular weight of at least 2000.

The solute component is comprised of various classes of polymers. For example, the solute polymer may be branched or may be modified. The solute polymer may be prepared using water reactive or water soluble monomers, monomers that are not free-radically polymerizable, and combinations thereof. Furthermore, the solute polymers may be prepared according to any polymerization method that may be known to those skilled in the art and can be generally found in various references such as "Principles of Polymerization" Odian, 3rd ed., Wiley Interscience.

Nonlimiting examples of useful solute polymers include poly(acrylates), poly(methacrylates), poly(styrene), elastomers such as rubbers (natural and or synthetic) or styrene-butadiene block copolymers, polyurethanes, polyureas, polyesters, crystalline and non-crystalline polymers such as crystalline and non-crystalline poly-alpha-olefins, crystalline poly(methacrylate) and crystalline poly(acrylate), and mixtures thereof.

Advantageously, this invention provides a composite microsphere PSA that can incorporate moieties that normally react in the water phase when used in monomeric forms prior to suspension polymerization of such monomers. Nonlimiting examples of solute polymers comprised of such water reactive moieties include, but are not limited to polymers containing maleic anhydride, itaconic anhydride, 2-vinyl-4, 4-dimethyl-2-oxazoline-5-one ("VDM"), and 2-(isocyanato) ethyl methacrylate.

Furthermore, highly water soluble moieties such as (meth) acrylic acid, N-vinyl pyrrolidone, (meth)acrylamide, poly (ethylene)oxide macromonomer, (meth)acrylimide, 1,1-dimethyl-1(2-hydroxylpropyl)amine methacrylimide, 1,1,1-trimethylamine methacrylimide, 1,1-dimethyl-1(2,3-dihydroxypropyl)amine methacrylimide, and other water soluble moieties such as N,N-dimethyl-N-(beta-methacryloxyethyl)ammonium propionate betaine, 4,4,9-trimethyl-4-azonia-7-oxo-8-oxa-dec-9-ene-1 sulfonate, sodium (meth) acrylate, ammonium acrylate, and maleic anhydride, for example can also be incorporated into the solute polymer used in the preparation of the composite pressure sensitive adhesive microspheres, provided that the solute polymer is essentially water insoluble.

Suspension Polymerization Process

The microsphere adhesives of the present invention are prepared by suspension polymerization. Suspension polymerization is a procedure wherein a monomer is dispersed in a medium (usually aqueous) in which it is insoluble. The polymerization is allowed to proceed within the individual monomer droplets. Monomer soluble free-radical initiators are preferably used. The kinetics and the mechanism are those for the corresponding bulk polymerization under similar conditions of temperature and initiator concentration.

To initiate the polymerization reaction, a sufficient number of free radicals are present. This may be achieved through several means, such as heat or radiation free-radical initiation. For example, heat or radiation can be applied to initiate the polymerization of the monomers, which results in an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. Oxygen dissolved in the reaction mixture can inhibit polymerization and it is desirable to expel this dissolved oxygen. Although, an inert gas bubbled into the reaction vessel or through the reaction mixture is an effective means of deoxygenation, other techniques for deoxygenation that are compatible with suspension polymerization can be used. Typically, nitrogen is used to deoxygenate, although any of the Group VIIIA (CAS version) inert gases are also suitable.

While specific time and stirring speed parameters are dependent upon monomers, and initiators, it may be desirable to pre-disperse the reaction mixture until the reaction mixture reaches a state where the average monomer droplet size is between about 1 and 300 micrometer, and preferably between 20 and 75 micrometer. The average particle size tends to decrease with increased and prolonged agitation of the reaction mixture.

Preferably, stirring and nitrogen purge are maintained throughout the reaction period. Initiation begins by heating the reaction mixture. Following polymerization, the reaction mixture is cooled.

In a one-step process both the 2-octyl(meth)acrylate monomer and any optional other polymerizable comonomer are present together in the suspension at the initiation of polymerization. The other components, such as the initiator, stabilizers, surfactants (if used), and modifiers are present in the reaction mixture.

Following polymerization, a stable aqueous suspension of microspheres at room temperature is obtained. The suspension may have non-volatile solids contents of from about 10 to about 70 percent by weight. The aqueous suspension of microspheres may be used immediately following polymerization because the suspension of microspheres is particularly stable to agglomeration or coagulation. The microspheres can be coated from an aqueous solution by a conventional coating techniques such as slot die coating to provide an adhesive coating.

The microspheres can be compounded with various rheology modifiers and/or latex adhesives or "binders". Typically, the adhesive coating which, when dried, exhibits a dry coating weight in the range of 0.2 to about 2 grams per square foot to provide an adhesive-coated sheet material in which the adhesive coating comprises polymeric microspheres, polymeric stabilizer, surfactant, and optionally rheology modifiers, and/or latex binder.

Properties of the microsphere PSAs of the present invention can be altered by the addition of a tackifying resin(s) and/or plasticizer(s) after the polymerization. Preferred tackifiers and/or plasticizers for use herein include hydrogenated rosin esters commercially available from such companies as Hercules, Inc. under the trade names of FORAL®, REGAL-REZ® and PENTALYN®. Tackifying resins also include those based on t-butyl styrene. Useful plasticizers include but are not limited to dioctyl phthalate, 2-ethylhexyl phosphate, tricresyl phosphate and the like. If such tackifiers and/or plasticizers are used, the amounts used in the adhesive mixture are amounts effective for the known uses of such additives.

Optionally, modifiers such as, rheology modifiers, colorants, fillers, stabilizers, pressure-sensitive latex binders and various other polymeric additives can be utilized. If such modifiers are used, the amounts used in the adhesive mixture are amounts effective for the known uses of such modifiers.

Substrates

Suitable backing or substrate materials for use in the present invention include, but are not limited to, paper, plastic films, cellulose acetate, ethyl cellulose, woven or nonwoven fabric comprised of synthetic or natural materials, metal, metallized polymeric film, ceramic sheet material and the like. In many embodiments, the backing or substrate material is 50 to 155 micrometer in thickness, although thicker and thinner backing or substrate materials may be used if desired. Typically the microsphere PSA composition will be applied or coated to at least a portion of a first side of the substrate. In some embodiments, a release coating is applied to a second side of the substrate generally in an area opposing that of the microsphere PSA.

Applications

Particularly useful articles prepared using the microsphere adhesives of the present invention include repositionable adhesive products such as repositionable note and paper products, repositionable tape and tape flags, easel sheets, repositionable glue stick and the like, but may also include other non-repositionable industrial commercial, and medical adhesive products.

EXAMPLES

The invention will be further explained with the following illustrative inventions.

Test Methods

The following test methods were used to evaluate the performance of the microsphere PSA of Example 1 and Comparative Example C1.

Adhesion to Bond Paper

Peel adhesion is the force required to remove a coated sheet from a bond paper substrate at a specific angle and rate of removal. In the examples this force is expressed in grams per one inch width of coated sheet. The procedure followed is:

A strip, one inch (2.54 cm) wide, of coated sheet (i.e., a sample) is applied to the horizontal surface of 20 pound (9.1 kg) bond paper. A 4.5 pound (2.0 kg) hard rubber roller is used to firmly apply the strip to the bond paper. The free end of the coated sheet is attached to the adhesion tester load cell such that the angle of removal will be 90°. The test plate is then clamped in the jaws of the tensile testing machine which is capable of moving the plate away from the load cell at a constant rate of 12 inches (30.5 cm) per minute. A load cell reading in grams per inch of coated sheet is recorded. The test was repeated and the data is reported as the average of the number of 3 trials.

Aged Adhesion to Bond Paper

A one inch (2.5 cm) wide strip of coated sheet is applied to the horizontal surface of 20 pound bond paper. A 4.5 pound (2.0 kg) hard rubber roller is used to firmly apply the strip to the bond paper. The laminates were aged at 70° F. (21° C.) and 80% relative humidity for 72 hours. After aging, peel adhesion of the samples was performed according to the test method of Adhesion to Bond Paper described above.

Tack

A TA-XT2i Texture Analyser made by Texture Technologies Corp. is used for the tack measurement. The specimen is held adhesive side up by a brass test fixture. A 7 mm stainless steel probe is brought into contact with the specimen until a specified force is reached, usually 100 g. After one second contact time, the probe is raised at speed of 0.5 mm/sec and the force of adhesion is measured as a function of the distance of the probe from the specimen. The tack is the peak removal force.

Static Angle Testing (SAT)

The SAT measures the ability of the sample to remain adhered on a standard test panel while being subjected to removal pressure at a specified peel angle under a constant load. The static angle test is one quantitative procedure for measuring detachment resistance of the sample.

In performing static angle test, six samples can be prepared using the following exemplary process. Each sample includes an adhesive stripe that is 18 mm wide by 33 mm long.

The test panel is a steel panel with a painted surface. Each sample is applied to the painted steel panel with the long dimension of the adhesive stripe horizontally oriented. Then, the sample is pressure adhered to the painted steel surface by two passes of an application roller with an application pressure of 1.5 pounds per square inch (77.6 mm of mercury).

The mounted sample is placed in a holder frame that is vertically oriented approximately perpendicular to a ground surface. The painted steel panel is held at a 300 downward angle relative to the vertically oriented frame. A 100 gram load is applied to the lower end of the coated sheet sample, proximate to the lower end of the holder frame. A timer is started upon application of the 100 gram load to measure how long the sample remains attached to the painted steel surface before the coated sheet sample detaches from the steel panel. The SAT usually runs to failure, i.e., until the sample actually detaches from the steel panel. The time to detachment is usually measured in seconds as the average of six results.

Example 1 and Comparative Example C1

TABLE 1

Polymerization formulations of Example 1 and Comparative Example C1

| Component function | Component | Example 1 (grams) | Comparative Example C1 (grams) |
|---|---|---|---|
| PM | 2-octylacrylate derived from non-petroleum resource | 314 | 0 |
| PM | 2-ethyl hexyl acrylate derived from a petroleum resource | 0 | 314 |
| PM | 2-hydroxyethylmethacrylate | 3.20 | 3.20 |
| PM | N-vinylpyrrolidone | 0.32 | 0.32 |
| PM | polyethylene oxide methacrylate (N K Ester M90G) | 1.63 | 1.63 |

TABLE 1-continued

Polymerization formulations of Example 1 and Comparative Example C1

| Component function | Component | Example 1 (grams) | Comparative Example C1 (grams) |
|---|---|---|---|
| Chain Transfer Agent | t-dodecyl mercaptan | 0.10 | 0.10 |
| Initiator | PERKODOX ® 16 | 0.2 | 0.32 |
| Initiator | LUPEROX ® A75 | 0.63 | 0.63 |
| Reaction Medium | deionized water | 258 | 258 |
| Surfactant | ammonium lauryl sulfate (STEPANOL ® AMV) | 2.36 | 2.36 |
| Surfactant | polyoxyethylene alkylphenyl ether ammonium sulfate (HITENOL ® BC-1025) | 2.64 | 2.64 |
| Polymeric Stabilizer | Polyacrylamide (CYANAMER ® N-300) | 0.18 | 0.18 |
| PM | Na Styrene Sulfonate | 1.29 | 1.29 |
| pH Buffer | Na Bicarbonate | 0.13 | 0.13 |

PM = polymerizable monomer
N K Ester M90G: Polyethylene oxide methacrylate from Shin Nakamura Chemical Company, Ltd. and Towa. Inc.
PERKODOX ® 16: Di(4-tert-butylcyclohexyl) peroxydicarbonate from Akzo Chemicals Inc.
LUPEROX ® A75: Benzoyl peroxide from Arkema
STEPANOL ® AMV: Ammonium lauryl sulfate from Stepan Co.
HITENOL ® BC-1025: Polyoxyethylene alkylphenyl ether ammonium sulfate from Montello Inc.
CYANAMER ® N-300: Polyacrylamide from Cytek Example 1

Microsphere Adhesive Polymerization Process

The 2-octylacrylate microsphere adhesive was prepared in water by a suspension polymerization process. To prepare the 2-octylacrylate microsphere adhesives of Example 1 the components indicated in Table 1 were charged into a 4 neck flask equipped with a reflux condenser, thermometer, stirrer, and a nitrogen gas inlet. The mixture was then mixed at 350 revolutions per minute for 30 minutes to achieve a desired monomer droplet size of around 50 micrometer. Once the monomer droplet size is in the specification as determined by an optical microscopy, the suspension was heated to an initiation temperature of 45° C. under a nitrogen atmosphere to initiate the polymerization. The reaction was allowed to exotherm. After polymerization, the batch was cooled to room temperature and filtered through a cheese cloth to remove coagulum. Particle size of the microsphere was 50 micrometer as measured by a Horiba LA910 particle size analyzer.

Comparative Example C1

Microsphere Adhesive Polymerization Process

The microsphere adhesive of Comparative Example C1 was prepared in water by suspension polymerization similar to that of Example 1 by charging the components indicated in Table 1 into a 4 neck flask. The 2-ethylhexylacrylate used was commercially available from Aldrich Chemicals and was derived from a petroleum resource. Particle size of the microsphere was 47 micrometer as measured by a Horiba LA910 particle size analyzer.
Microsphere PSA Compositions The microsphere adhesives of Example 1 and Comparative Example C1 were then each compounded with a latex binder, CARBOTAC® 26222, and a thickener, KELZAN® S, and ACRYSOL® TT935, as indicated in Table 2. Viscosity of the microsphere PSA compositions was adjusted by the thickeners to be around 950 cps measured at 30 rpm by a Brookfield Viscometer. The compounded microsphere PSA compositions were coated on paper at a coat weight of 0.35 grams per square foot for evaluation.

TABLE 2

Compounding formulations of Example 1 and Comparative Example C1

| Ingredients | Compounded Example 1 | Compounded Comparative Example C1 |
|---|---|---|
| Example 1 | 400 | 0 |
| Comparative Example C1 | 0 | 400 |
| CARBOTAC ® 26222 (Binder) | 16 | 16 |
| KELZAN ® S (Thickener) | 0.43 | 0.43 |
| deionized water | 13.75 | 13.75 |
| ACRYSOL ® TT935 (Thickener) | 3.46 | 2.65 |
| Sodium Hydroxide (10% solution) | 3.1 | 1.63 |
| MSA viscosity (cps at 30 rpm) | 930 | 960 |

TABLE 3

Adhesive Performance of Example 1 and Comparative Example C1 at an adhesive dry coating weight of 0.350 gram per square foot

| Tests | Example 1 | Comparative Example C1 |
|---|---|---|
| Initial adhesion to paper (gram/in) | 54 | 53 |
| Aged adhesion to paper (gram/in) | 73 | 89 |
| Tack/texture analyzer (gram) | 17 | 14 |
| Static Angle Testing (seconds) | 165 | 47 |

As the data in Table 3 indicates, the compounded adhesive of Example 1 performs as well as, and in some cases, better than that of Comparative Example C1. In particular, the adhesive of Comparative Example C1 had higher adhesion build over time. In many applications, the increase in adhesion build is undesirable because more peel force is required to remove the sample from the surface to which it is attached. For example, when the microsphere PSA of Comparative Example C1 is applied to a piece of paper which is then later applied to a display surface, such an easel pad, over time more force is required to peel the piece of paper off the easel when compared to the microsphere PSA of Example 1.

Furthermore the SAT of the adhesive of Example 1 far outperforms that of Comparative Example C1, meaning that the microsphere PSA of Example 1 has much longer hanging time when applied to a vertical surface such as a wall.

When evaluated in accordance with ASTM D 6866-06a, the compounded adhesive of Example 1 was found to have a biobased carbon content of about 70% whereas the compounded adhesive of Comparative Example C1 was found to have a biobased carbon content of about 1%. Thus, in addition to the surprising adhesion performance, the composition of the invention enables a reduction in use of petroleum resources and reduction in emission of greenhouse gases.

Several patent applications and patents are cited herein; each is incorporated by reference herein in its entirety.

Various modifications and alterations of this invention will become apparent to those skilled in the art without departing from the scope and spirit of this invention.

What is claimed is:

1. An adhesive comprising a reaction product of (a) at least one polymerizable monomer derived at least in part from 2-octanol derived from non-petroleum resources; (b) at least one initiator; and (c) at least one stabilizer, wherein the reaction occurs in water to yield a microsphere adhesive.

2. The adhesive of claim 1 wherein the non-petroleum resource is castor oil.

3. The adhesive of claim 1 wherein said adhesive has a biobased carbon content of at least about 30%.

4. The adhesive of claim 1 wherein said adhesive has a biobased carbon content of at least about 40%.

5. The adhesive of claim 1 wherein said adhesive has a biobased carbon content of at least about 50%.

6. The adhesive of claim 1 wherein said adhesive has a biobased carbon content of at least about 65%.

7. The adhesive of claim 1 wherein the reaction product further comprises a surfactant.

8. The adhesive of claim 1 comprising the reaction product of from about 92.0 to 99.9 wt % of component (a), from about 0.01 to 4.0 wt % component (b); and from about 0.01 to 4 wt % of component (c), wherein the wt % of each component is based on the total weight of all the components.

9. A pressure sensitive adhesive composition comprising:
(a) microsphere adhesive comprising a reaction product of
(i) at least one polymerizable monomer derived at least in part from non-petroleum resources; (ii) at least one initiator; and (iii) at least one stabilizer, wherein the reaction occurs in water;
(b) at least one pressure sensitive adhesive binder; and
(c) at least one thickener.

10. The composition of claim 9 comprising from about 90 to 98 wt % component (a), from about 1 to 10 wt % component (b), and from about 0.1 to 3.0 wt % component (c).

11. The composition of claim 10 disposed on at least a portion of a first surface of a backing selected from the group consisting of paper, polymeric film, woven fabric, non-woven fabric of synthetic or natural materials, metal, metallized polymeric film, and ceramic sheet.

12. An adhesive comprising a reaction product of the following reaction mixture:
(a) from about 92.0 to 99.9 wt % of 2-octyl(meth)acrylate prepared by reacting (meth)acrylic acid with 2-octanol, wherein the 2-octanol is derived from non-petroleum resource;
(b) from about 0.01 to 4.0 wt % of at least one polymeric stabilizer; and
(c) from about 0.01 to 4.0 wt % of at least one initiator;
wherein the wt % of each component is based on the total of components (a) to (c) and wherein the reaction occurs in water to yield a microsphere adhesive.

13. The adhesive of claim 12 wherein said reaction mixture further comprises a polymerizable comonomer selected from the group consisting of:
(1) up to about 75 wt % of at least one alkyl(meth)acrylate comonomer having from about 1 to 14 carbon atoms;
(2) up to about 30 wt % of at least one solute polymer;
(3) less than about 5 wt % at least one polar comonomer;
(4) up to about 10 wt % of at least one amido comonomer;
(5) up to about 10 wt % of at least one polyethylene oxide (meth)acrylate comonomer;
(6) up to about 5 wt % of at least one ionic comonomer;
(7) up to about 1 wt % of at least one crosslinker; and
(8) combinations thereof,
wherein the wt % is based on the 2-octyl(meth)acrylate content.

14. The adhesive of claim 12 wherein said reaction mixture further comprises up to about 0.2 wt %, based on the 2-octyl (meth)acrylate content, of at least one chain transfer agent.

15. A microsphere adhesive composition comprising:
(a) from about 90 to 98 wt % of the microsphere adhesive of claim 12;
(b) from about 1 to 10 wt % of at least one binder; and
(c) from about 0.1 to 3.0 wt % of at least one thickener.

16. An adhesive article comprising the microsphere adhesive of claim 12 disposed on at least a portion of a first surface of a backing selected from the group consisting of paper, polymeric film, woven fabric, non-woven fabric of synthetic or natural materials, metal, metallized polymeric film, and ceramic sheet.

17. The article of claim 16 further comprising a release coating disposed on at least a portion of a second surface of the backing such that the release coating lies substantially opposing the adhesive composition.

18. An adhesive consisting of a reaction product of:
(a) from about 87 to 99.9 wt % of 2-octyl(meth)acrylate prepared by reacting (meth)acrylic acid and 2-octanol, wherein the 2-octanol is derived from a non-petroleum resource;
(b) from about 0.01 to 5 wt % of at least one surfactant;
(c) from about 0.01 to 4 wt % of at least one polymeric stabilizer;
(d) from about 0.01 to 4.0 wt % of at least one initiator;
wherein the wt % of each component is based on the total of components (a) to (d);
(e) up to about 75 wt %, based on component (a), of at least one alkyl(meth)acrylate comonomer having from about 1 to 14 carbon atoms;
(f) less than about 5 wt %, based on component (a), of at least one polar comonomer;
(g) up to about 10 wt %, based on component (a), of at least one amido comonomer;
(h) up to about 10 wt %, based on component (a), of at least one polyethylene oxide (meth)acrylate;
(i) up to about 30 wt %, based on component (a), of at least one solute polymer; and
(j) up to about 0.2 wt %, based on component (a), of at least one chain transfer agent,
(k) up to about 5 wt %, based on component (a), of at least one ionic monomer; and
(l) up to about 1 wt %, based on component (a), of at least one crosslinker;
wherein the reaction occurs in water to yield a microsphere adhesive.

19. The adhesive of claim 18 wherein the alkyl(meth)acrylate comonomer is selected from the group consisting of isooctyl acrylate, isononyl (meth)acrylate, isoamyl (meth) acrylate, isodecyl (meth)acrylate, 2-ethylhexyl acrylate, n-butyl (meth)acrylate, sec-butyl (meth)acrylate, propyl (meth)acrylate, ethyl (meth)acrylate, methyl (meth)acrylate, isobornyl (meth)acrylate, 4-methyl-2-pentyl (meth)acrylate, 2-methylbutyl (meth)acrylate, t-butyl (meth)acrylate, and combinations thereof.

20. The adhesive of claim 18 wherein the polar comonomer is selected from the group consisting of (meth)acrylic acid, 2-hydroxyethyl (meth)acrylate, and combinations thereof.

21. The adhesive of claim 18 wherein the amido comonomer is selected from the group consisting of N-vinyl pyrrolidone, N-vinyl caprolactom, acrylamide, N,N-dimethyl acrylamide, and combinations thereof.

22. A microsphere adhesive composition comprising:
(a) from about 90 to 98 wt % of the microsphere adhesive of claim 18;
(b) from about 1 to 10 wt % of at least one binder; and
(c) from about 0.1 to 3.0 wt % of at least one thickener.

23. An adhesive article comprising the microsphere adhesive of claim 22 disposed on at least a portion of a first surface of a backing selected from the group consisting of paper, polymeric film, woven fabric, non-woven fabric of synthetic or natural materials, metal, metallized polymeric film, and ceramic sheet.

24. The article of claim 23 further comprising a release coating disposed on at least a portion of a second surface of the backing such that the release coating lies substantially opposing the adhesive composition.

* * * * *

UNITED STATES PATENT AND TRADEMARK OFFICE
CERTIFICATE OF CORRECTION

PATENT NO. : 8,318,303 B2
APPLICATION NO. : 12/337293
DATED : November 27, 2012
INVENTOR(S) : Ying-Yuh Lu Page 1 of 2

It is certified that error appears in the above-identified patent and that said Letters Patent is hereby corrected as shown below:

In the Specification:

Column 2,
Line 25, delete "and or" and insert -- and/or --, therefor.

Column 3,
Line 58, delete "and or" and insert -- and/or --, therefor.

Column 4,
Line 19, delete "polyvinyl-pyrollidone" and insert -- polyvinyl- pyrrolidone --, therefor.

Column 5,
Line 9, delete "N-alkybetaines." and insert -- N-alkylbetaines. --, therefor.

Column 6,
Line 20, delete "glyercol" and insert -- glycerol --, therefor.
Line 31, delete "actanoate," and insert -- octanoate, --, therefor.
Line 66, delete "caprolactom," and insert -- caprolactam, --, therefor.

Column 7,
Line 43, delete "and or" and insert -- and/or --, therefor.
Line 66, delete "1 sulfonate," and insert -- 1-sulfonate, --, therefor.

Column 10,
Line 40, delete "300" and insert -- 30° --, therefor.

Column 11,
Line 10 (approx.), Delete "PERKODOX®" and insert -- PERKADOX® --, therefor.

Signed and Sealed this
Tenth Day of December, 2013

Margaret A. Focarino
*Commissioner for Patents of the United States Patent and Trademark Office*

CERTIFICATE OF CORRECTION (continued)
U.S. Pat. No. 8,318,303 B2

Column 11,
Line 23 (approx.), delete "PERKODOX®" and insert -- PERKADOX® --, therefor.

In the Claims:

Column 13,
Line 59, in Claim 13, after "5 wt %" insert -- of --.

Column 14,
Line 66, in Claim 21, delete "caprolactom," and insert -- caprolactam, --, therefor.